United States Patent
Kawano et al.

(10) Patent No.: US 8,014,255 B2
(45) Date of Patent: Sep. 6, 2011

(54) HOLOGRAPHIC RECORDING APPARATUS, HOLOGRAPHIC REPRODUCING APPARATUS, HOLOGRAPHIC RECORDING METHOD AND HOLOGRAPHIC REPRODUCING METHOD

(75) Inventors: Katsunori Kawano, Kanagawa (JP); Makoto Furuki, Kanagawa (JP); Jiro Minabe, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 753 days.

(21) Appl. No.: 12/024,151

(22) Filed: Feb. 1, 2008

(65) Prior Publication Data

US 2009/0003180 A1     Jan. 1, 2009

(30) Foreign Application Priority Data

Jun. 27, 2007    (JP) ................................. 2007-168622

(51) Int. Cl.
     *G11B 7/00*      (2006.01)
(52) U.S. Cl. .......................................... 369/103; 369/94
(58) Field of Classification Search .................... 369/103
     See application file for complete search history.

(56) References Cited

U.S. PATENT DOCUMENTS

| | | | | |
|---|---|---|---|---|
| 5,149,980 A * | 9/1992 | Ertel et al. | ............... | 250/559.32 |
| 5,191,574 A * | 3/1993 | Henshaw et al. | ............. | 369/100 |
| 5,422,873 A * | 6/1995 | Kewitsch et al. | ............. | 369/103 |
| 6,178,019 B1 * | 1/2001 | Wilson | ............................. | 359/10 |
| 6,285,474 B1 * | 9/2001 | Kawano et al. | ................. | 359/29 |
| 7,324,255 B2 * | 1/2008 | Tanaka et al. | ................. | 359/245 |
| 7,738,152 B2 * | 6/2010 | Butler et al. | .................... | 359/30 |
| 7,738,341 B2 * | 6/2010 | Hara et al. | ..................... | 369/103 |
| 2006/0171006 A1 | 8/2006 | Fukumoto et al. | | |
| 2009/0262408 A1 | 10/2009 | Ogasawara | | |

FOREIGN PATENT DOCUMENTS

| | | |
|---|---|---|
| JP | 10-302293 A | 11/1998 |
| JP | 2000-098862 A | 4/2000 |
| JP | 2000-298837 A | 10/2000 |
| JP | 2006-209081 A | 8/2006 |
| JP | 2006-330294 A | 12/2006 |
| WO | 2007/026521 A1 | 3/2007 |

OTHER PUBLICATIONS

JP 2000-298837 Kono Katsunori Oct. 24, 2000 English Translation.*
Japanese Office Action, dated May 24, 2011, issued in Application No. 2007-168622.

* cited by examiner

*Primary Examiner* — Van N Chow
(74) *Attorney, Agent, or Firm* — Sughrue Mion, PLLC

(57) ABSTRACT

A holographic recording apparatus is provided and includes: a signal light generation section that generates signal light modulated according to digital data; a reference light generation section that generates reference light modulated by means of a pixel pitch; a adding section that adds, in proximity to a light-convergence position where the signal light and the reference light come close to each other or overlap each other, a low-order component of the signal light obtained by Fourier transform and a high-order component of the reference light obtained by Fourier transform, the high-order component of the reference light having a spatial frequency region differing from that of the low-order component of the signal light; and an illumination optical system that irradiate an optical recording medium with the added signal and reference light.

11 Claims, 7 Drawing Sheets

HOLOGRAPHIC RECORDING APPARATUS, HOLOGRAPHIC REPRODUCING APPARATUS, HOLOGRAPHIC RECORDING METHOD AND HOLOGRAPHIC REPRODUCING METHOD

CROSS-REFERENCE TO RELATED APPLICATION

This application is based on and claims priority under 35 USC §119 from Japanese Patent Application No. 2007-168622 filed Jun. 27, 2007.

BACKGROUND (i) Technical Field

The present invention relates to a holographic recording apparatus, a holographic reproducing apparatus, a holographic recording method, and a holographic reproduction method.

(ii) Related Art

A holographic recording and reproducing method is a method for recording or reproducing digital data by means of recording or reproducing, as a hologram, signal light in which binary digital data "0 and 1" are digitally imaged as "bright and dark", for example. In the case of a Fourier transform hologram, the signal light is subjected to Fourier transform by means of a lens, and a Fourier-transformed image is irradiated on an optical recording medium. Simultaneously, reference light which interferes with the signal light to generate interference fringes is also irradiated on the optical recording medium.

When the signal light and the reference light are spatially overlapped and recorded on a common optical axis, the signal light and the reference light interfere with each other over a wide area in the optical recording medium. In this case, there is a necessity for separating the signal light and the reference light from each other when the hologram is reproduced.

SUMMARY

According to an aspect of the invention, there is provided a holographic recording apparatus comprising:

a signal light generation section that generates signal light modulated according to digital data;

a reference light generation section that generates reference light modulated by means of a pixel pitch;

an adding section that adds, in proximity to a light-convergence position where the signal light and the reference light come close to each other or overlap each other, a low-order component of the signal light obtained by Fourier transform and a high-order component of the reference light obtained by Fourier transform, the high-order component of the reference light having a spatial frequency region differing from that of the low-order component of the signal light; and an illumination optical system that irradiate an optical recording medium with the added signal and reference light.

BRIEF DESCRIPTION OF THE DRAWINGS

Embodiments of the present invention will be described in detail based on the following figures, wherein.

DETAILED DESCRIPTION

Exemplary embodiments of the present invention will be hereunder described by reference to the drawings.

Figure 1:
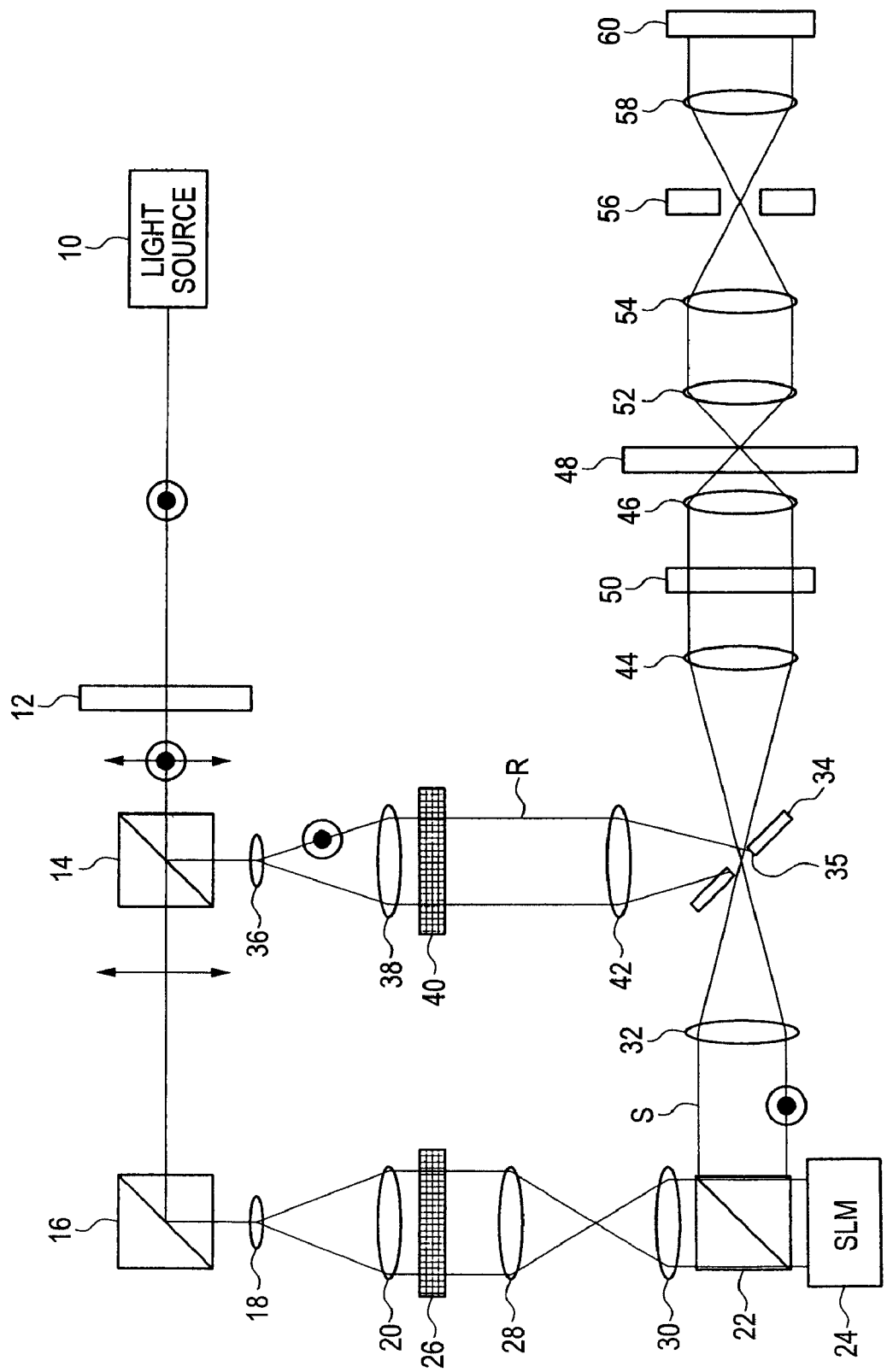
FIG. 1 shows a configuration of a holographic recording and reproducing apparatus according to an exemplary embodiment of the present invention.

FIG. 1 shows an example configuration of a holographic recording and reproducing apparatus according to an exemplary embodiment of the present invention. In FIG. 1, when signal light is recorded as a hologram, firstly linearly-polarized coherent light from a light source 10 is made to enter a polarizing beam splitter 14 through a $\lambda/2$ plate 12, to separate the light into light for signal light S and light for reference light R. The $\lambda/2$ plate 12 rotates, in a certain direction of polarization, the direction of polarization of the linearly-polarized light from the light source 10. By means of the certain direction of polarization, a ratio of light for signal light S passing through a polarizing beam splitter 14 to light for reference light R reflected by the polarizing beam splitter 14 is adjusted. When the light exiting from the light source 10 is not linearly-polarized light, it is possible to place a polarizer in lieu of the $\lambda/2$ plate 12 and to convert the coherent light from the light source 10 into light linearly polarized in the certain direction of polarization.

In relation to the light for signal light S, the direction of an optical path is changed, as required, by means of an appropriate mirror 16. The light is converted into collimated light of a wide diameter by means of lenses 18 and 20, and the collimated light passes through the polarizing beam splitter 22, to enter a spatial light modulator 24. Depending on the arrangement of the $\lambda/2$ plate 12, the polarizing beam splitter 22, the spatial light modulator 24, and the like, the mirror 16 may be omitted. Moreover, a random phase mask 26 for suppressing d.c. components of the signal light S, or the like, may also be disposed in the optical path for the light for the signal light S. In this case, relay lenses 28 and 30 may also be interposed between the random phase mask 26 and the spatial light modulator 24.

The spatial light modulator 24 is formed from, for example, a liquid-crystal panel, and displays a digital image (a binary image) where binary digital data "0, 1" are taken as "bright, dark", by means of a computer or the like. As a result, the intensity of the light reflected on the spatial light modulator 24 is modulated according to values of respective pixels of a binary image, and the light becomes signal light S. In the embodiment shown in FIG. 1, when the signal light S is reflected on the spatial light modulator 24, the direction of polarization is rotated through 90 degrees, to coincide with the direction of polarization of the reference light R. As a result, the signal light S is reflected on the polarizing beam splitter 22 and is gathered at the location of an adding section 34 by means of a lens 32. The adding section 34 is a mirror at the center of which a light transmission section 35 is formed. In the embodiment shown in FIG. 1, the adding section is configured such that a portion or all of the signal light S passes through the light transmission section 35.

Although in the embodiment shown in FIG. 1 the spatial light modulator 24 serves as a light modulator of reflection type which reflects light, the spatial light modulator may also be of transmission type which causes light to transmit. In that case, the direction of polarization of the signal light S should be rotated through 90 degrees. Arrangement of the λ/2 plate in the optical path, or the like, is conceivable as specific means.

Figure 2:
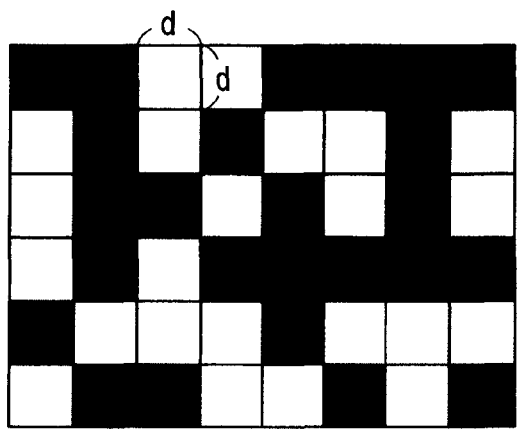
FIG. 2 shows an example of a portion of a binary image displayed on a spatial light modulator.

FIG. 2 shows a portion of a binary image displayed on the spatial light modulator 24. As mentioned previously, in relation to the binary image, binary digital data "0, 1" are displayed as "bright, dark." In FIG. 2, a black-and-white rectangular pattern corresponds to a binary image displayed as "bright, dark," and each of black and white rectangular areas are formed from, e.g., d×d=2×2 pixels. In the present embodiment, each rectangular area is called a pixel unit, and the length "d" of one side of the area is described as a "pixel pitch."

Light for reference light R is reflected on the polarizing beam splitter 14, and the direction of the light is changed. The light is then converted into collimated light by means of the lenses 36 and 38, to enter a modulation plate 40 which modulates the reference light R. For instance, the modulation plate 40 includes: an intensity modulation type in which black and white patterns are formed in the modulation plate 40 and which allows light to pass through only the white patterns; and a phase modulation type in which irregular patterns are formed in the surface of the plate in place of the black and white patterns and which allows the phase of light passing through recessed areas to differ from the phase of light passing through protruding areas.

Figure 3:
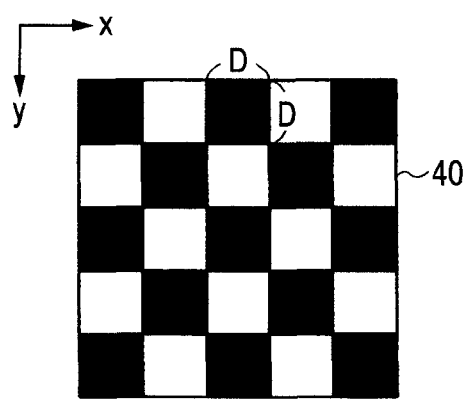
FIG. 3 shows an exemplary configuration of a modulation plate.

FIG. 3 shows an exemplary configuration of the modulation plate 40. FIG. 3 shows an example of the modulation plate 40 of intensity modulation type. In FIG. 3, a checkered pattern, in which black and white rectangular areas are alternately arranged in the directions "x" and "y" of the drawing, is formed in the modulation plate 40. In the present embodiment, the areas of the black pattern block light, and the areas of the white pattern allow transmission of light. The size of each of the rectangular areas is "D×D". A value of D can be set arbitrarily except a value in which the entire area of the modulation plate 40 becomes white or black. However, the value of D can be set so as to come to "2d" or less or "d" or less with respect to the size "d" of the black-and-white pattern formed in the spatial light modulator 24. Reasons therefor will be described later.

Figure 4A:
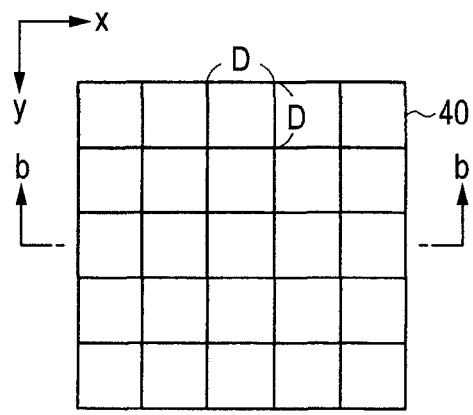
FIG. 4 shows another exemplary example configuration of the modulation plate.
Figure 4B:
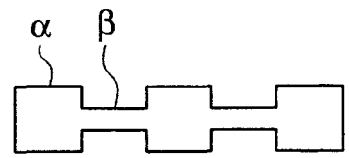

FIGS. 4A and 4B show another exemplary configuration of the modulation plate 40. FIGS. 4A and 4B show an example of the modulation plate 40 of phase modulation type. The modulation plate 40 is formed from an optically-transparent material, such as glass, and has a random pattern in which rectangular patterns of depressions and projections are randomly arranged in both the directions "x" and "y" in the drawing or a checkered pattern in which the rectangular patterns are alternately formed in a periodic manner. Of these patterns, a checkered pattern where two types of patterns having a phase difference n are periodically arranged may be preferable. The reason for this is that, since the zeroth-order component of the light substantially disappears when the light modulated by such a pattern is subjected to Fourier transform, the amount of light eliminated by the adding section 34 can be reduced, and thus utilization efficiency of light is enhanced. Each of the rectangular areas is "D×D". The value of D can be determined arbitrarily except a value in which the entire area of the modulation plate 40 assumes a uniform thickness. Setting the value of D to "2d" or less or "d" or less with respect to the size "d" of the black-and-white pattern formed in the spatial light modulator 24 may be preferable. The reason for this will be described later.

FIG. 4B is an example cross-sectional view taken along line b-b in FIG. 4A, in which the checkered pattern is periodic. A projecting surface α and a recessed surface β are formed alternately at each length D. The cross-sectional view of FIG. 4B shows a cross section taken along the direction "x" in FIG. 4A, but a cross section taken along the direction "y" also becomes analogous to FIG. 4B. When light passes through the modulation plate 40 of the present embodiment, light passed through the projecting surfaces and light passed through the recessed surfaces exit in different phases. The phase of light can be periodically modulated between two values, namely, 0 and n, so long as the thickness of the projecting surfaces and the thickness of the recessed surfaces are adjusted appropriately.

The reference light R passed through the modulation plate 40 is gathered to the location of the adding section 34 by means of the lens 42. As mentioned previously, the light transmission section 35 is formed in the center of the adding section 34. Of the reference light R collected (Fourier-transformed) by means of the lens 42, low-order components (low spatial frequency components) gathered to and around the focal point of the lens 42 are eliminated. Specifically, the adding section 34 acts as a spatial frequency filter which eliminates a low spatial frequency component in connection with the spatial frequency of the reference light R. The spatial frequency component eliminated by the adding section 34 is a spatial frequency component which induces superposing of a light-convergence position on the signal light S when subjected to Fourier transform. Consequently, the spatial frequency component of the reference light R—which has not been eliminated by the adding section 34 and which still remains—is a high-order component (a high spatial frequency component) having a spatial frequency region differing from that of the low-order component of the signal light S.

Of the reference light R, components (high spatial frequency components) exclusive of components obtained at and around a focal point of the lens 42 are reflected by the adding section 34, to be added along with the signal light S passed through the light transmission section 35. Here, the word "adding" means that the signal light S and the reference light R spatially overlap each other with their optical axes coinciding with each other. The expression "coincidence of the optical axes" implies a deviation falling within the range of ordinary design errors and does not mean that any nominal deviations are not allowed.

As mentioned above, the signal light S and the reference light R converges at the position of the adding section 34 by means of the lens 32 and the lens 42, respectively. Hence, positions (light-convergence positions) at which the light beams converges are closely proximate to each other or overlap each other. Moreover, the high spatial frequency component of the reference light R and the signal light S are added together in the vicinity of the light-convergence positions that are close proximate to each other or overlap each other. The term "the light-convergence positions closely proximate to each other" refers to a location where the high spatial frequency component of the reference light R and the signal light S spatially overlap each other after (the signal light S) passing through the adding section 34 or (the reference light R) undergoing reflection.

When holographic recording has hitherto been performed, signal light and reference light are situated at spatially-separated locations. Hence, a hologram is formed in so small area (which is in fact only a neighborhood of the Fourier transform plane of the lens in many cases) where the signal light and the reference light interfere with each other. For this reason, even when the thickness of the optical recording medium is increased, a hologram cannot be effectively recorded in a thicknesswise direction, and a signal-to-noise ratio achieved during reproduction cannot be enhanced. Consequently, difficulty is encountered in increasing storage capacity.

Even in the case of a recording method generally called coaxial holographic recording, only the signal light and the reference light share an optical axis, and the signal light and the reference light are spatially separated from each other.

If signal light and reference light are spatially overlapped and recorded in a common optical axis, the signal light and the reference light will interfere with each other over a wide area in a thickness wise direction of the optical recording medium. Therefore, an increase in signal-to-noise ratio acquired during reproduction or effective recording of a hologram in the thicknesswise direction of an optical recording medium can be attained. However, in this case, the signal light and the reference light should be separated from each other during reproduction operation. There is an example of changing directions of polarization of signal light and reference light by using a recording medium capable of recording the direction of polarization of light.

The present invention enables spatially-overlapped recording of signal light and reference light and separation of the signal light from the reference light during reproduction without use of a special optical recording medium capable of recording the direction of polarization of incident light. The reason for this will be described later by reference to FIG. 5.

Turning back to FIG. 1, the light into which the signal light S and the reference light R have been added together by the adding section 34 is converted into collimated light by means of the lens 44 and collected (Fourier-transformed) by means of the Fourier transform lens 46, to be irradiated on the optical recording medium 48. In this case, the optical recording medium 48 is arranged so as to include a position in front of or behind the Fourier transform plane of the Fourier transform lens 46 in the optical path. Thereby, interference fringes generated by adding of the signal light S and the reference light R can be recorded as a hologram in the optical recording medium 48. At this time, the optical recording medium 54 may not be located on the Fourier transform plane of the Fourier transform lens 46. The λ/4 plate 50 may be interposed between the lens 44 and the Fourier transform lens 46, to convert the light into circularly-polarized light and record a hologram.

Figures 5A, 5B, 5C:
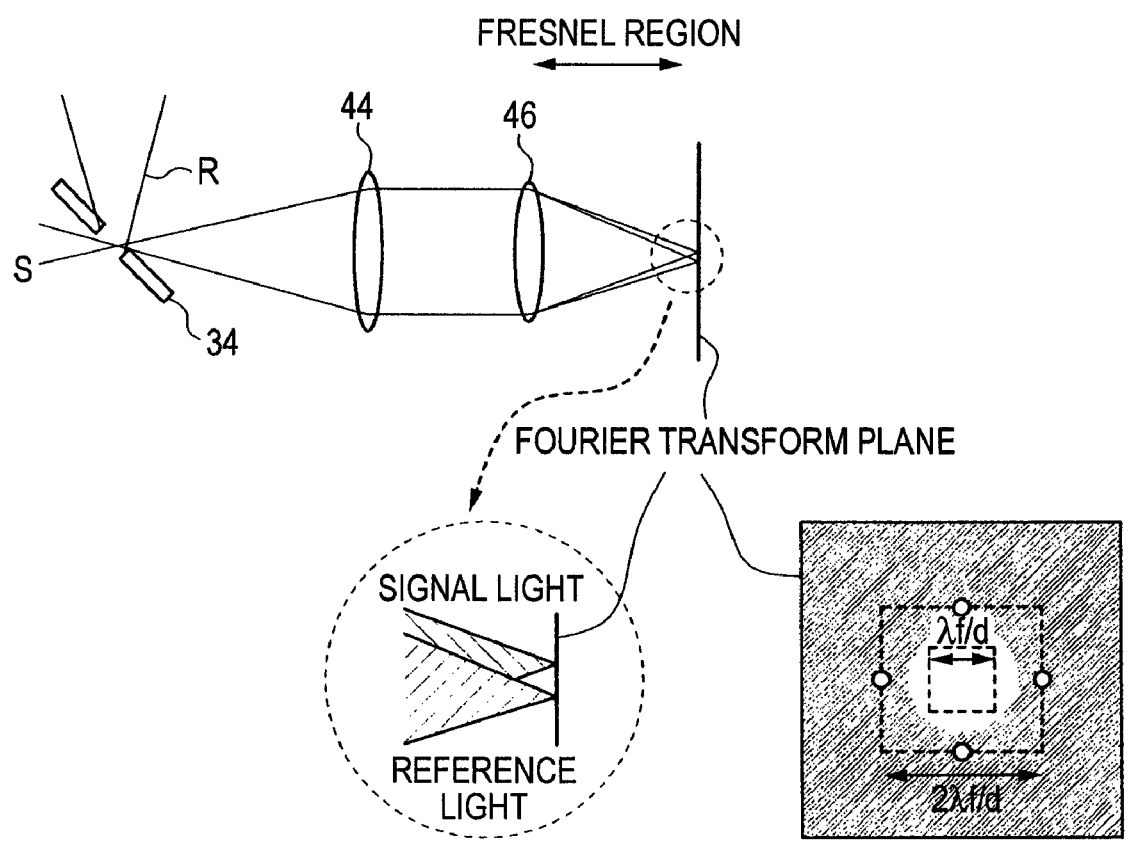
FIG. 5 is a descriptive view of the behavior of signal light and reference light which are added together.

FIGS. 5A, 5B, and 5C show descriptive views of behavior of the signal light S and the reference light R that are added together. In FIG. 5A, the signal light S and the reference light R, which have been added by the adding section 34, are converted into collimated light by means of the lens 44 as mentioned above, and the collimated light is gathered by means of the Fourier transform lens 46. Interference fringes have developed, as a result of adding of the signal light S and the reference light R, in an area extending from the adding section 34 to a position forward of the Fourier transform plane of the Fourier transform lens 46. In the meantime, the signal light S and the reference light R are separated from each other on the Fourier transform plane as a result of Fourier transform.

FIG. 5B is a descriptive view of light-convergence positions, at which the signal light S and the reference light R converge, on the Fourier transform plane enclosed by a broken line shown in FIG. 5A. The light-convergence position of the signal light S and the light-convergence position of the reference light R on the Fourier transform plane differ from each other.

In general, when light of a pixel pitch "d" is subjected to Fourier transform, a Fourier spectrum of light exhibits a vertical, horizontal spread of λf/d around the focal point of the Fourier transform lens 46, provided that the focal length of the Fourier transform lens 46 is "f" and that the wavelength of light is λ. Accordingly, the Fourier spectrum of light converges within the range of a rectangular area measuring 2λf/d per side. The way of convergence of the Fourier spectrum is shown in FIG. 5C. In FIG. 5C, the rectangular area which is centered on the focal point of the Fourier transform lens 46 and which measures 2λf/d per side is indicated by a broken line, and the rectangular area is an area to which light of pixel pitch "d" converges.

The reference light R is modulated by the modulation plate 40 where the checkered pattern, each matrix of "D×D", is formed. When subjected to Fourier transform in the Fourier transform lens 46, the reference light R is converted into a periodic bright point on the Fourier transform plane. On the assumption of D=d, the bright point is situated at each of the sides of the rectangle measuring 2λf/d per side. The bright point is expressed as a white point in FIG. 5C. When there stands a relationship of D=2d, the bright point is situated at each of the sides of the rectangle measuring λf/d per side.

When the zeroth-order light is included in the reference light R, a bright point into which the zeroth-order light has been transformed is present at the focal point of the Fourier transform lens 46 on the Fourier transform plane (the center of the rectangular area indicated by the broken line in FIG. 5C). However, in the present embodiment, the zeroth-order light included in the reference light R is eliminated by the light transmission section 45 formed in the center of the adding section 34, and hence the reference light R added with the signal light S does not include the zeroth-order light. Accordingly, the bright point into which the zeroth-order light of the reference light R has been transformed is not present at the focal point of the Fourier transform lens 46 on the Fourier transform plane. The modulation plate 40 shown in FIGS. 4A and 4B are of phase modulation type. When a modulation plate—in which a binary of phase difference n is periodically arranged—is used, the zeroth-order light beams cancel each other out on the Fourier transform plane, and hence the reference light R does not originally include the zeroth-order light. For this reason, elimination of the zeroth-order light becomes unnecessary, and utilization efficiency of light can be enhanced.

As mentioned above, in the case of D=d, the signal light S and the reference light R do not overlap each other on the Fourier transform plane. Even when D=2d is achieved by increasing the value of D (which corresponds to modulation of light at a low spatial frequency), an overlap achieved on the Fourier transform plane cannot be said to be sufficient. Even when the reference light R includes a much lower spatial frequency component, the component is eliminated by the adding section 34. As a consequence, the signal light S and the reference light R cannot overlap each other sufficiently on the Fourier transform plane in the present embodiment. Therefore, in order to record a hologram in the optical recording medium 48, the optical recording medium 48 is arranged so as to include a Fresnel region located forward of the Fourier transform plane (on the same side of the Fourier transform lens 46) in the optical path. The reason for this is that the signal light S and the reference light R overlap each other in the Fresnel region, to generate interference fringes. The optical recording medium 48 may also be arranged at a position behind the Fourier transform plane (on the side opposite to the Fourier transform lens 46) in the optical path.

When information is reproduced from diffracted light from the hologram, only the reference light R is irradiated on the optical recording medium 48. In the case shown in FIG. 1, ideally all of light rays from the light source 10 can be adjusted so as to come into light which is to be reflected by the polarizing beam splitter 14, by means of adjustment of the $\lambda/2$ plate 12. As mentioned above, by virtue of the adding section 34, the reference light R also does not include a low spatial frequency component including the zeroth-order light. In the present embodiment, the reference light R is used as reading light for reading the information recorded as a hologram in the optical recording medium 48.

Diffracted light (signal light S) which originates in the hologram of the optical recording medium 48 when irradiated with the reference light R and the reference light R are converted into collimated light by means of an inverse Fourier transform lens 52, and the collimated light is gathered by means of the lens 54. A low-pass filter 56 is placed at the focal point of the lens 54 (on the Fourier transform plane). The low-pass filter 56 is for allowing passage of the light converging at and around the focal point of the lens 54; namely, the light modulated by a low spatial frequency.

As mentioned above, in a case where the modulation plate 40 for modulating the reference light R has a checkered pattern of rectangular areas, each of which measures "D×D", the adding section 34 is configured so as to allow passage of the reference light R having a spatial frequency which is greater than that achieved in the case of D=d, and thereby a bright point obtained as a result of Fourier transform of the reference light R is situated in or outside each of the sides of the rectangle measuring $2\lambda f/d$ per side, as shown in FIG. 5C. On condition that the range of light which is allowed to pass through the low-pass filter 56 is set to the entire inside of the rectangle measuring $2\lambda f/d$ per side, namely, the light corresponds to the signal light S having a spatial frequency which is lower than the spatial frequency achieved after the reference light R passing through the adding section 34, all frequency components of the signal light S can be extracted while being separated from the reference light R.

Likewise, even in the case of D=2d, the adding section 34 is arranged to allow passage of the reference light R having a spatial frequency which is equal to or greater than the spatial frequency achieved in the case of D=2d, a bright point into which the reference light R has been Fourier-transformed is situated on or outside each of the sides of the rectangle measuring $\lambda f/d$ per side. Accordingly, on condition that the range of light which is allowed to pass through the low-pass filter 56 is set to the entire inside of the rectangle measuring $\lambda f/d$ per side, namely, the light corresponds to the signal light S having a spatial frequency which is lower than the spatial frequency achieved after the reference light R passing through the adding section 34, portions of the frequency components of the signal light S can be extracted. Frequency components of the signal light S gathered to the rectangular area measuring $\lambda f/d$ per side become a Nyquist frequency of the signal light S. According to a signal processing theory, so long as a spatial frequency falling within the range of the Nyquist frequency is reproduced, information is not lost though deterioration of a reproduced image, and hence digital data can be reproduced.

As mentioned above, the diffracted signal light S from a hologram and the reference light R can be readily separated from each other during reproduction of the hologram, by means of recording or reproducing the hologram through use of the reference light R from which the low frequency components have previously been eliminated by the adding section 34.

The reference light R and the signal light S are transformed into collimated light by means of a lens 58, and the collimated light is received by a photodetector 60, and information included in the hologram is obtained.

Figure 6:
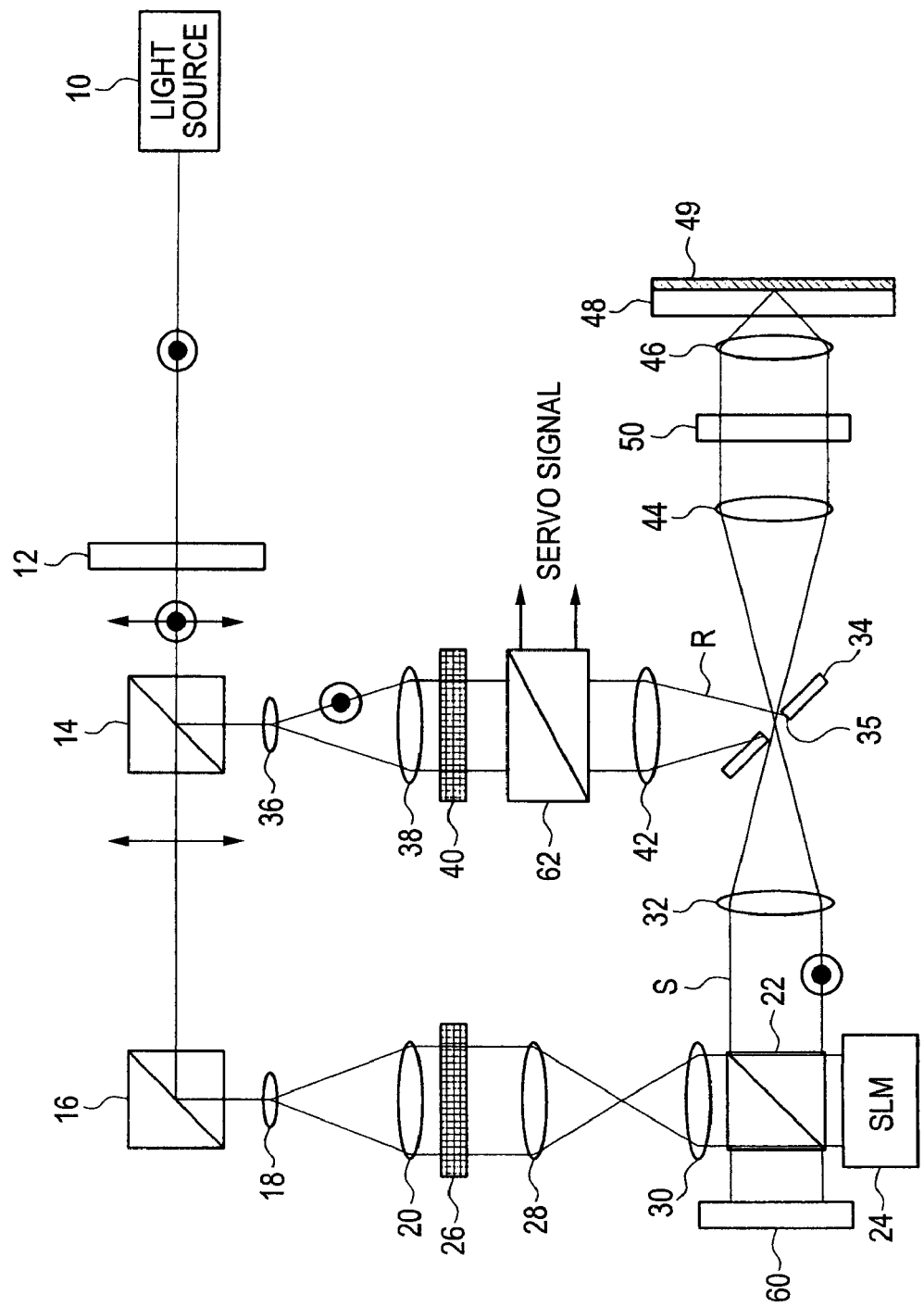
FIG. 6 shows a configuration of a holographic recording and reproducing apparatus according to another exemplary of the present invention.

FIG. 6 shows an exemplary configuration of a holographic recording and reproducing apparatus according to another exemplary embodiment of the present invention. Elements which are the same as those shown in FIG. 1 are assigned the same reference numerals, and their explanations are omitted. The feature of the configuration shown in FIG. 6 lies in that the optical recording medium 48 is of reflection type, namely, when the reference light R is irradiated, the diffracted light (the signal light S) from the hologram and the reference light R are reflected in the incident direction of the reference light R. Therefore, a reflection surface 49 for reflecting light is formed on the back of the optical recording medium 48.

In the embodiment shown in FIG. 6, a polarizing beam splitter 62 for causing the reference light R reflected by the polarizing beam splitter 14 to pass is disposed in the optical path of the reference light R. After passing through the polarizing beam splitter 62, the reference light R is irradiated on the optical recording medium 48 through an optical path analogous to the optical path of the embodiment shown in FIG. 1 and used for recording or reproducing a hologram. In the embodiment shown in FIG. 6, a hologram is recorded by light transformed into circularly-polarized light by means of the $\lambda/4$ plate 50. However, during recording operation, the signal light S and the reference light R are reflected by the reflection surface 49 of the optical recording medium 48. During reproducing operation, the diffracted light and the reference light R are reflected by the reflection surface 49. At the time of reflection, the direction of rotation of the circularly-polarized light is inverted. Consequently, when the reflected signal light S, the reference light R, and the diffracted light are transformed into linearly-polarized light by means of the $\lambda/4$ plate 50, the linearly-polarized light is polarized in the direction which is rotated through 90 degrees with reference to the original direction of polarization. Thus, after being reflected by the adding section 34, the reference light R serving as reflected light also undergoes reflection on the polarizing beam splitter 62 during recording and reproducing operations, to be extracted outside the optical path for the reference light R. The thus-extracted reference light R serving as reflected light can be used for, for example, a servo signal which is for the purpose of controlling positioning during recording or reproduction of data in or from the optical recording medium 48. After passing through the light transmission section 35 of the adding section 34, the diffracted light also passes through the polarizing beam splitter 22 even at the time of reproducing operation and is received by the photodetector 60 located on the side opposite to the optical recording medium 48 with the polarizing beam splitter 22 interposed therebetween.

Figure 7:
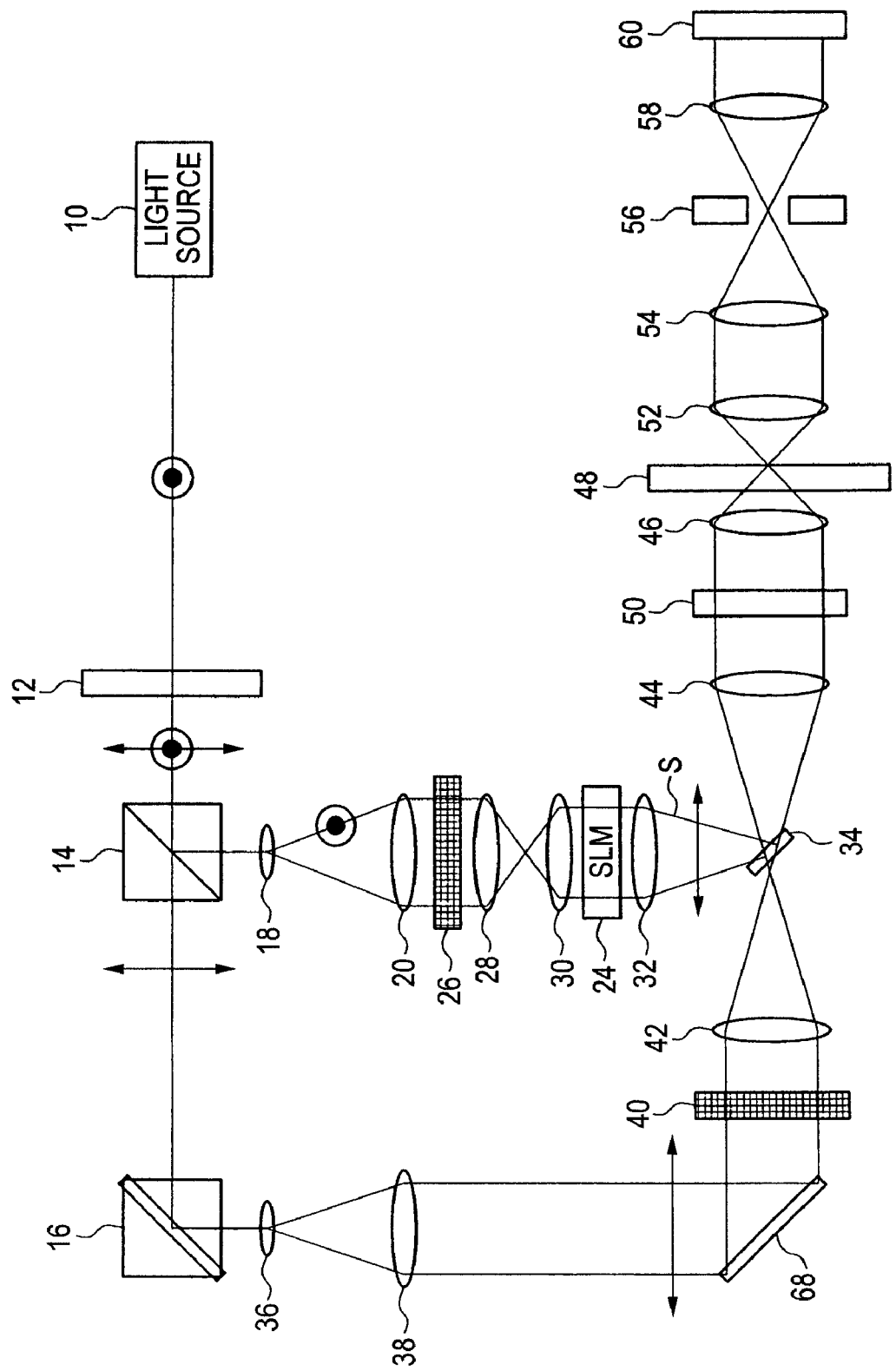
FIG. 7 shows a configuration of a holographic recording and reproducing apparatus according to still another exemplary of the present invention.

FIG. 7 shows an exemplary configuration of a holographic recording-and-reproducing apparatus according to still another exemplary embodiment of the present invention. Elements which are the same as those shown in FIG. 1 are assigned the same reference numerals, and their explanations are omitted. A characteristic of the configuration shown in FIG. 7 lies in that the light reflected by the polarizing beam splitter 14 is used as light for signal light S. Specifically, the intensity of the signal light S is modulated by means of: converting the light reflected by the polarizing beam splitter 14 into collimated light of wide diameter by the lenses 18 and 20; dampening d.c. components by a random phase mask 26; and causing the collimated light to enter the spatial light modulator 24 by way of the relay lenses 28 and 30. In the present embodiment, the spatial light modulator 24 is of transmission type, and the light passed through the spatial light modulator 24 turns into the signal light S. In the case of the present embodiment, the direction of polarization of passing light (linearly-polarized light) is rotated through 90 degrees in the spatial light modulator 24. When the direction of polarization is not rotated by means of the spatial modulator 24, the essential requirement is to add the λ/2 plate between the polarizing beam splitter 14 and the adding section 34. The signal light S is caused to converge to the position of the adding section 34 by the light-condensing lens 32.

The direction of an optical path for the light passed through the polarizing beam splitter 14 is changed by the appropriate mirror 16, and the light is converted into collimated light by lenses 36 and 38. The direction of the optical path is further changed by the mirror 68, as required. Subsequently, the spatial frequency of the reference light R is modulated by the modulation plate 40. Subsequently, the reference light is caused to converge to the position of the adding section 34 by the lens 42.

In the configuration shown in FIG. 7, the adding section 34 is configured to block passage of light at and around the focal point of the lens 42 in order to eliminate, from the reference light R gathered (Fourier-transformed) by the lens 42, low-order components (low spatial frequency components) overlapping the spatial frequency of the signal light S. Specifically, the reference light R traveling downstream of the adding section 34 is only the light passed around the adding section 34. Therefore, the adding section may also be embodied as, for example, a mirror which reflects the light gathered to and around the focal point of the lens 42 to a direction differing from the direction heading toward the optical recording medium 48. The adding section 34 is also equipped with a mirror which reflects the signal light S gathered by the condensing lens 32 toward the optical recording medium 48. By means of such a configuration, the signal light S and high-order components of the reference light R are added together. The thus-added light is irradiated on the optical recording medium 48 in the same manner as in the embodiment shown in FIG. 1, and thus a hologram is recorded.

In FIG. 7, when information is reproduced from diffracted light from the hologram, only the reference light R is irradiated on the optical recording medium 48 as in the embodiment shown in FIG. 1.

Figure 8:
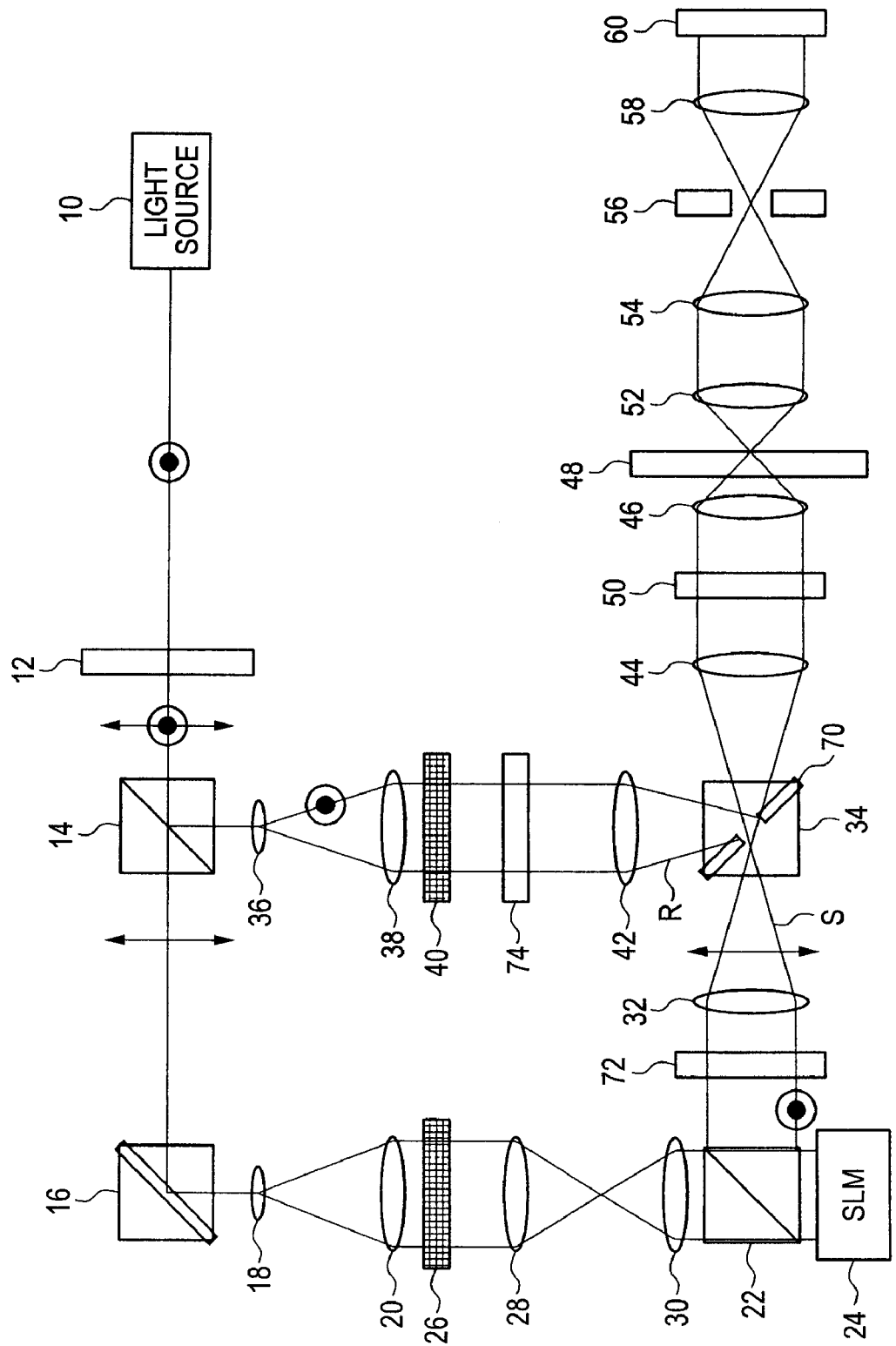
FIG. 8 shows a configuration of a holographic recording and reproducing apparatus according to still another exemplary of the present invention.

FIG. 8 shows an exemplary configuration of a holographic recording and reproducing apparatus according to still another exemplary embodiment of the present invention. Elements which are the same as those shown in FIG. 1 are assigned the same reference numerals, and their explanations are omitted. A characteristic of the configuration shown in FIG. 8 lies in that a polarizing beam splitter with a mirror 70 having at the center thereof an aperture is used as the adding section 34. Although the adding section 34 shown in FIG. 1 is formed from a mirror having the light transmission section 35, the light transmission section 35 is usually formed from an optically-transparent material, such as glass. Therefore, the signal light S or the reference light R passes through obliquely-arranged glass, which may cause disturbance in formation of a hologram. In contrast, since the adding section 34 shown in FIG. 8 is formed from a polarizing beam splitter formed from an optically-transparent material, such as glass, into the shape of a rectangular parallelepiped, passage of the signal light S or the reference light R through obliquely-arranged glass is avoided.

In the embodiment shown in FIG. 8, the signal light S exiting from the polarizing beam splitter 22 is converted, by a λ/2 plate 72, into light which is oriented in the direction of polarization and which passes through the polarizing beam splitter constituting the adding section 34. The reference light R is also converted into light which is oriented in the direction of polarization and which passes through the polarizing beam splitter constituting the adding section 34 by means of the λ/2 plate 74. Of the reference light R, low-order components (low spatial frequency components) overlapping the spatial frequency of the signal light S pass through the aperture at the center of the mirror 70, to thus become eliminated. In the meantime, high-order components of the reference light R are reflected by the mirror 70, to thus become added with the signal light S. The thus-added light is irradiated on the optical recording medium 48 in the same manner as in the embodiment shown in FIG. 1, whereupon a hologram is recorded.

In FIG. 8, when information is reproduced from the diffracted light from the hologram, only the reference light R is radiated onto the optical recording medium 48 in the same manner as in the embodiment shown in FIG. 1.

Figure 9:
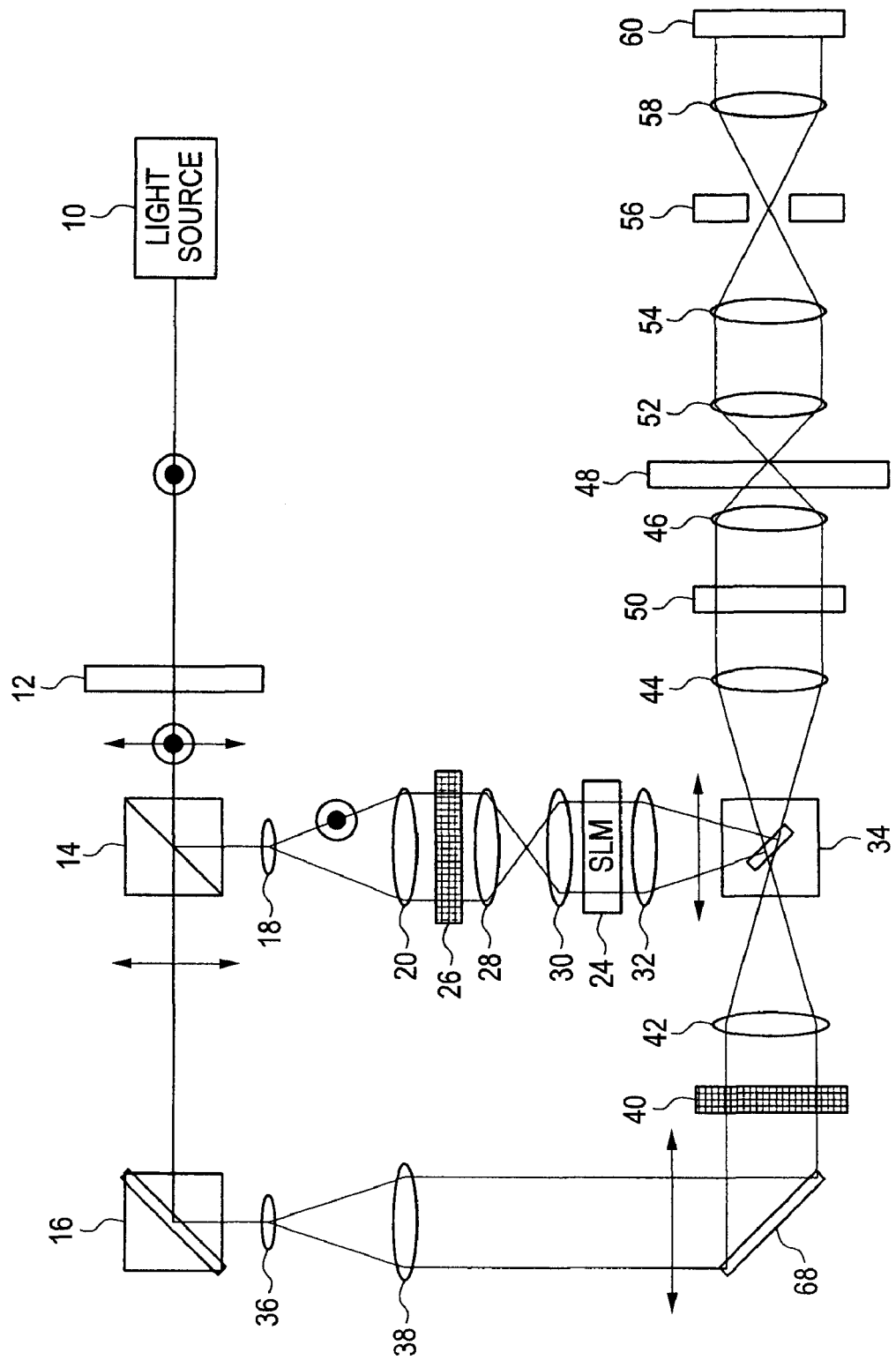
FIG. 9 shows a configuration of a holographic recording and reproducing apparatus according to still another exemplary of the present invention.

FIG. 9 shows an exemplary configuration of a holographic recording and reproducing apparatus according to still another exemplary embodiment of the present invention. Elements which are the same as those shown in FIG. 7 are assigned the same reference numerals, and their explanations are omitted. A characteristic of the configuration shown in FIG. 9 lies in that a polarizing beam splitter having at the center thereof a mirror is used as the adding section 34. The reason why the polarizing beam splitter is used as the adding section 34 is the same as that described in connection with the embodiment shown in FIG. 8.

The signal light S is reflected toward the optical recording medium 48 by means of the mirror of the adding section 34. Further, propagation of low-order components of the reference light R overlapping the spatial frequency of the signal light S toward the optical recording medium 48 is blocked by the mirror of the adding section 34. Only high-order components are added with the signal light S, and the thus-added light is irradiated on the optical recording medium 48.

In FIG. 9, when information is reproduced from the diffracted light from the hologram, only the reference light R is radiated onto the optical recording medium 48 in the same manner as in the embodiment shown in FIG. 1.

Although several embodiments of the present invention have been described above, the present invention is not limited to the embodiments.

What is claimed is:

1. A holographic recording apparatus comprising:
   a signal light generation section that generates signal light modulated according to digital data;
   a reference light generation section that generates reference light modulated by means of a pixel pitch;
   an adding section that adds, in proximity to a light-convergence position where the signal light and the reference light come close to each other or overlap each other, a low-order component of the signal light obtained by Fourier transform and a high-order component the reference light obtained by Fourier transform, to thereby generate an added signal, the high-order component of the reference light having a spatial frequency region differing from that of the low-order component of the signal light; and
   an illumination optical system that irradiate an optical recording medium with the added signal and reference light, wherein the adding section includes a spatial frequency filter that extracts the high-order component from the reference light subjected to Fourier transform.

2. The holographic recording apparatus according to claim 1, wherein the low-order component of the signal light includes a Nyquist region of the signal light.

3. The holographic recording apparatus according to claim 1, wherein the low-order component of the signal light includes a region falling within $\lambda f/d$ around a focal point of a Fourier transform lens which Fourier-transforms the signal light, wherein $\lambda$ represents a wavelength of the signal light, f represents a focal length of the Fourier transform lens, and d represent a pixel pitch of a binary image by which the signal light is spatially modulated.

4. The holographic recording apparatus according to claim 1, wherein the reference light is phase-modulated.

5. The holographic recording apparatus according to claim 4, wherein the reference light is periodically phase-modulated by means of a binary numeral so as to have a phase difference of $\pi$.

6. The holographic recording apparatus according to claim 1, wherein the optical recording medium is a medium that reflects the reference light in an incident direction the reference light, and the reference light reflected by the optical recording medium is a servo control signal for controlling positioning of the optical recording medium.

7. The holographic recording apparatus according to claim 1, wherein the adding section is included in an optically-transparent material having a rectangular parallelepiped shape.

8. A holographic reproducing apparatus for reproducing a hologram that is recorded in an optical recording medium with a recording light that is obtained by adding, in proximity to a light-convergence position where signal light modulated according to image data and reference light modulated by means of a pixel pitch come close to each other or overlap each other, a low-order component of the signal light obtained by Fourier transform and a high-order component of the reference light obtained by Fourier transform, the high-order component of the reference light having a spatial frequency region differing from that of the low-order component of the signal light, the holographic reproducing apparatus comprising:
  a light generation section that generates reading light which is substantially identical with the high-order component of the reference light;
  an illumination optical system that irradiates the optical recording medium with the reading light;
  a Fourier transform section that subjects light diffracted from the optical recording medium to Fourier transform;
  a signal light extraction section that extracts the signal light at a Fourier transform plane formed by the Fourier transform section; and
  a spatial frequency filter that extracts the high-order component from the reference light subjected to Fourier transform.

9. The holographic reproducing apparatus according to claim 8, wherein the optical recording medium is a medium that reflects the reference light in an incident direction the reference light, and the reference light reflected by the optical recording medium is a servo control signal for controlling positioning of the optical recording medium.

10. A method for recording a hologram, the method comprising:
  generating signal light modulated according to digital data;
  generating reference light modulated by means of a pixel pitch;
  adding, in proximity to a light-convergence position where the signal light and the reference light come close to each other or overlap each other, a low-order component of the signal light obtained by Fourier transform and a high-order component of the reference light obtained by Fourier transform, to thereby generate an added signal, the high-order component of the reference light having a spatial frequency region differing from that of the low-order component of the signal light;
  irradiating an optical recording medium with the added signal and reference light and
  extracting, using a spatial frequency filter, the high-order component from the reference light subjected to Fourier transform.

11. A method for reproducing a hologram that is recorded in an optical recording medium with a recording light that is obtained by adding, in proximity to a light-convergence position where signal light modulated according to image data and reference light modulated by means of a pixel pitch come close to each other or overlap each other, a low-order component of the signal light obtained by Fourier transform and a high-order component of the reference light obtained by Fourier transform, the high-order component of the reference light having a spatial frequency region differing from that of the low-order component of the signal light, the method comprising:
  generating reading light which is substantially identical with the high-order component of the reference light;
  irradiating the optical recording medium with the reading light;
  subjecting light diffracted from the optical recording medium to Fourier transform;
  extracting the signal light at a Fourier transform plane formed by the Fourier transform section; and
  extracting, using a spatial frequency filter, the high-order component from the reference light subjected to Fourier transform.

* * * * *